United States Patent [19]

Emura et al.

[11] 4,436,685

[45] Mar. 13, 1984

[54] CONTINUOUS PRESS FORMING METHOD FOR SHEET RESIN

[75] Inventors: Koji Emura; Tuneo Suzuki; Hidemichi Kazama, all of Fuji, Japan

[73] Assignee: Yamakawa Industrial Company, Limited, Shizuoka, Japan

[21] Appl. No.: 380,434

[22] Filed: May 20, 1982

[30] Foreign Application Priority Data

Dec. 1, 1981 [JP] Japan .................. 56-193454

[51] Int. Cl.³ ............................................ B29C 17/14
[52] U.S. Cl. .................. 264/148; 264/40.6; 264/160; 264/210.5; 425/324.1
[58] Field of Search .............. 264/145, 148, 151, 157, 264/160, 210.5, 40.6; 425/324.1, 388

[56] References Cited

U.S. PATENT DOCUMENTS 3,824,761  7/1974  Wright ........................... 264/151
4,105,386  8/1978  Thiel et al. ..................... 425/324.1
4,140,457  2/1979  Miki et al. ....................... 425/384

Primary Examiner—Donald E. Czaja
Assistant Examiner—Mary A. Becker
Attorney, Agent, or Firm—Wenderoth, Lind & Ponack

[57] ABSTRACT

A continuous method of press forming a sheet resin, which is capable of subjecting to a consecutive process the steps of extruding a molten resin, forming the molten resin into a sheet resin strip, cutting the sheet resin strip into sheet resin pieces and press forming the sheet resin pieces. These steps are continuously carried out synchronously with one another by means of synchronizing devices, while the sheet resin is maintained at the desired temperature so as to possess proper thermoplasticity and surface stiffness through the medium of two thermal controls.

11 Claims, 10 Drawing Figures

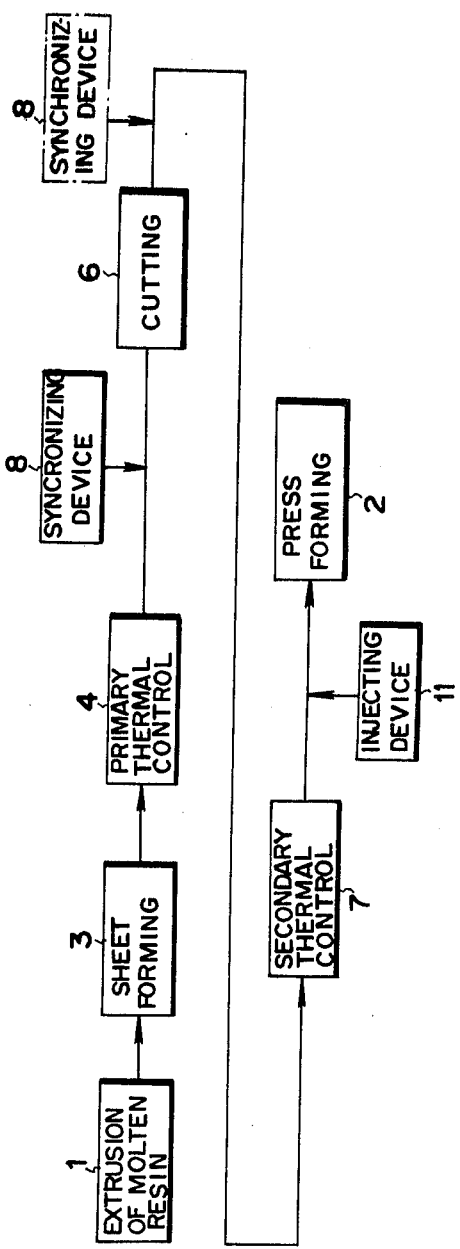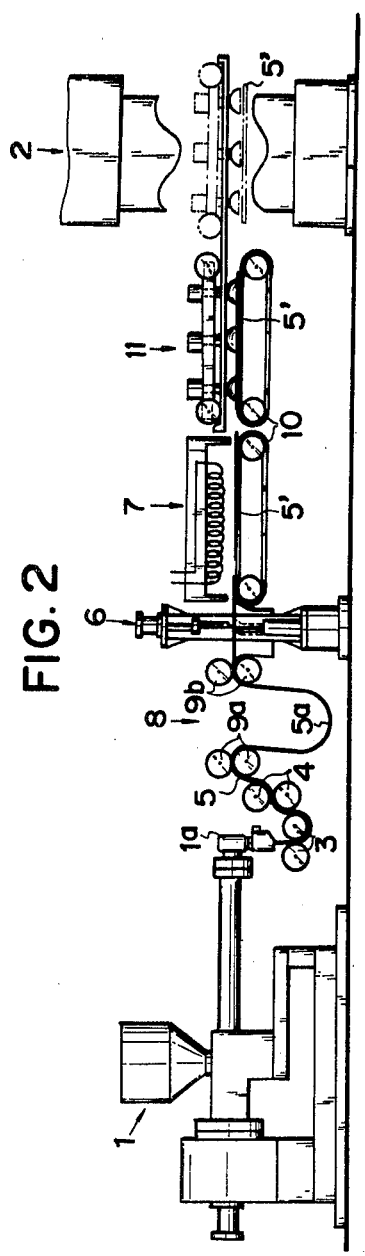

CONTINUOUS PRESS FORMING METHOD FOR SHEET RESIN

BACKGROUND OF THE INVENTION

The present invention relates to a continuous press forming method of a sheet resin, which method comprises the steps of extruding a molten resin, forming the molten resin into a sheet resin strip, cutting the sheet resin strip into sheet resin pieces and press forming the sheet resin pieces on a consecutive basis.

The press forming of sheet resins is generally referred to as stamping molding or compression molding and adopted to mold a drawn formed product of a relatively large size, which is not suitable for being subjected to injection molding and also in molding a fiberglass-containing resin, which is difficult to be processed by injection-molding. This is because press molding makes it possible to effect release molding by use of a generally known press machine.

Generally, a merchant buys a semi-fabricated material manufactured in the form of a sheet resin by the manufacture of raw material, and processes it into a sheet resin product in such a way that the resin material is softened with heat and the softened resin material is injected into a molding die by hand. This method of forming a sheet resin by use of a press has come to find increasingly popular acceptance. However, a typical machine used to practice such a method employs a very expensive sheet resin and utilizes much electric power to have the sheet resin softened. Also poor workability and producibility is involved in such a method. When the sheet resin, once hardened is again softened with heat, resin specks inevitably occur inside and on the surface of the sheet resin. Even if a high temperature process for producing the sheet resin is carried out to prevent occurrence of such resin specks, there is a possibility of causing deterioration of the surface of the sheet resin, giving rise to chaps and cracks on the surface of the sheet resin product. This reduces the reliability of the sheet resin in respect to strength.

SUMMARY OF THE INVENTION

One object of this invention is to provide a continuous press forming method using a sheet resin, which method is capable of continuously forming a molten resin into sheet resin pieces and transferring the sheet resin pieces directly into a press forming machine to make a sheet resin product of good quality and which completely remedies the shortcomings of conventional press forming methods and improves the workability and economics of practicing this method.

To accomplish the above objectives according to the present invention, there is provided a continuous press forming method of sheet resins, which comprises continuously extruding a molten resin from a supply source, subjecting the molten resin extruded from the supply source to a sheet forming process to obtain a softened sheet resin strip, cutting the sheet resin strip into sheet resin pieces of a fixed length, injecting the sheet resin pieces into a press forming machine, and clamping the sheet resin pieces by use of the press forming machine.

In this method, the extrusion process of the molten resin from the supply source and the sheet forming process for obtaining a softened sheet resin strip are synchroneously carried out, and the softened sheet resin strip obtained in the sheet forming process and the sheet resin pieces obtained by the cutting process are respectively subjected to primary and secondary temperature controls. According to this invention, all the processing steps can be practiced in one consecutive operation, and this forming method is capable of overcoming the shortcomings of the conventional press forming method and also of producing a sheet resin product of good quality and improved workability and on an economical basis.

The other objects and characteristics of the present invention will become apparent from the further disclosure of the invention to be made hereinafter with reference to the accompanying drawings.

BRIEF EXPLANATION OF THE DRAWINGS

FIG. 1 is a flow chart illustrating the processing steps from the extrusion of the molten resin to the press forming in the continuous press forming method according to this invention.

FIG. 2 is a schematic view of the mechanism of practicing the processing steps involved in FIG. 1.

DESCRIPTION OF THE PREFERRED EMBODIMENTS

Figure 3A:
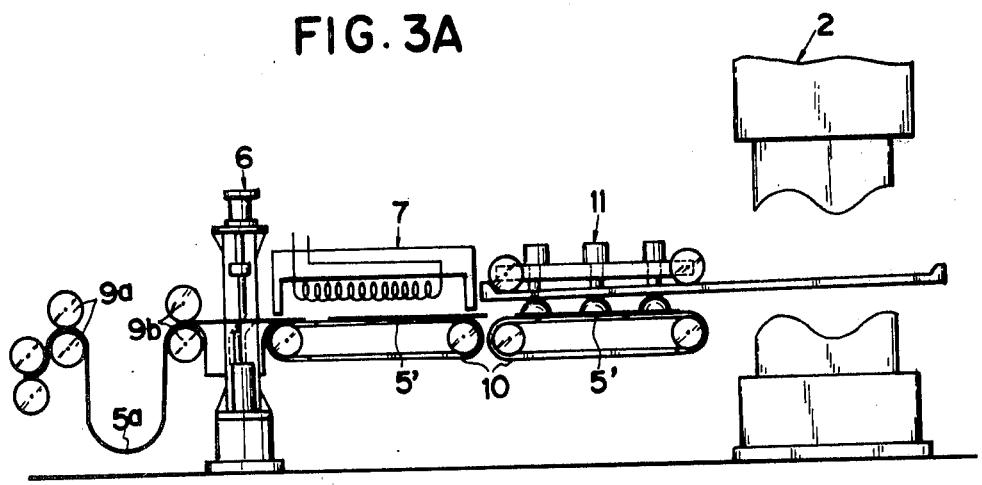
FIGS. 3(A) and 3(B) are explanatory views, respectively illustrating a synchronizing device used in one embodiment of the press forming method according to this invention.

This invention relates to a press forming method for continuously forming a molten resin into a sheet resin and successively transferring the sheet resin directly into a press machine to produce a sheet resin product of good quality.

Referring now to the drawings, 1 denotes an extruder serving as a supply source for a molten resin installed at the first stage of a continuous press forming line for producing a sheet resin product, and 2 a press forming machine installed at the final stage of the aforementioned press forming line.

The molten resin is continuously extruded through the die 1a of the extruder 1 and formed into a sheet resin strip by means of a pair of sheet-forming rollers 3 mounted on the outlet portion of the die 1a.

The sheet-forming rollers 3 are maintained at a temperature lower than the melting point of a resin substance to be worked out, at which the sheet resin is usually regulated so as to secure flatness and a fixed thickness of the sheet resin. Thus, the sheet resin strip can be continuously produced. Incidentally, the melting point of polypropylene is about 160° C. and that of polyethylene is about 130° C. Since the molten resin is extruded from the die while being heated at a temperature above the melting point thereof, consequently to exhibit high fluidity, it is cooled when passing between the paired forming rollers to form the sheet resin strip, and then, the surface of the sheet resin strip is further regulated.

Denoted by 4 are a pair of primary thermal controlling rollers for permitting the aforementioned softened sheet resin strip to be maintained constant at a fixed temperature to be possessed of the desired surface stiffness and thermoplasticity. Taking into account the temperature drop of the sheet resin strip being caused when transferring it into a secondary thermal control process via a cutting process, the maintenance of the fixed temperature range in the primary thermal control aims at selecting the temperature at which the sheet resin strip is transferred into a secondary thermal control process while compensating for temperature fluctuations caused in delivering the sheet to the successive cutting process. The temperature determined for the primary thermal control depends upon the type of resin and may usually be selected within the range of approximately 90° to 150° C.

For example, in the case of polypropylene used as a resin substance, it is suitable to specify the temperature of the softened sheet resin strip fed between the sheet forming rollers 3 within the range of approximately 130° to 140° C., and in the case of polyethylene, within the range of approximately 100° to 110° C.

Therefore, when the temperature at the inlet of the primary thermal controller is higher or lower than the aforementioned temperature range, it should be controlled so as to be kept in that range. Generally, in spite of differences in the type of a resin used, it is preferable to specify the temperature of the primary thermal control process within the range of 10° to 30° C. below the melting point of the resin. The sheet resin strip 5 is gradually heated up to the desired temperature by use of a plurality of paired primary thermal controlling rollers 4 which are driven at a speed determined by considering the feeding speed for the sheet resin strip, in such a way that the sheet resin strip is wound round and passed between some paired rollers 4 with sufficient contact time between the rollers to ensure that the temperature of the sheet is within a predetermined range. Successively, the softened sheet resin strip 5 kept constant in temperature by means of the thermal controlling rollers 4 in the primary thermal control process is forwarded to the cutting process (which also includes punching operations).

By 6 is denoted a cutter means (a punching die in case of punching work). The softened sheet resin strip 5 is cut or punched into sheet resin pieces of the desired dimensions by means of the cutter means 6. The cutting process for the softened sheet resin strip 5 is accomplished without fail because the sheet resin strip is submitted to the primary thermal control to permit the strip to be kept at a temperature suitable for cutting.

For the cutting process, a slide cutter, a rotary cutter or a punching machine may be used. By 7 is denoted a secondary thermal controlling furnace installed between the cutter means 6 and the successive press forming machine 2.

The softened sheet resin pieces 5' of fixed dimensions which are produced by the cutting process are forwarded into the secondary thermal controlling furnace 7 and then, the sheet resin pieces are regulated to be kept at the temperature determined in accordance with the type of resin substance.

The function of the secondary thermal control is to not only have the sheet resin piece 5' possessed of adequate surface stiffness and softening properties, but also is designed to maintain the sheet at sufficient temperatures to readily work out the sheet resin pieces by pressing. To be specific, by the secondary thermal control process, the sheet resin pieces 5' can easily be transferred into the press forming machine and formed into the desired shape. In this secondary thermal control process, the sheet resin piece 5' is passed in the art at an increased temperature kept constant in the secondary thermal controlling furnace 7, or it is heated by using the heat radiated by a heater as illustrated in the drawings. Consequently, the surface of the sheet resin piece 5', which is susceptible to temperature reduction, can be maintained at the desired forming temperature.

A proper temperature for allowing the sheet resin to exhibit surface stiffness necessary for conveying and injecting the sheet resin piece into the press forming machine is preferably determined in the range of approximately 130° to 150° C. in the case of polypropylene and approximately 100° to 120° C. in the case of polyethylene.

When another type of resin is used, the temperature for the secondary thermal control is determined in the range of from 100° to 160° C. The softened sheet resin pieces 5' obtained by the cutting process have different self-temperatures varying with atmospheric temperature in processing and give rise to a temperature difference between the states before and after the cutting process.

Such dispersion in the self-temperature of the softened sheet resin piece 5' is improved by means of the aforementioned secondary thermal control and the sheet resin piece thus regulated in temperature is injected into the press forming machine 2. It is required that the sheet resin piece be subjected to thermal control in the secondary thermal control process lest the surface stiffness vanish from the sheet resin, so that it can be lifted and transferred into the press forming machine by means of an injecting machine 11 as described later.

The characteristics of polypropylene which is extensively used are as follows:

|  | Tensile Strength $(kg/cm^2)$ | Average Elongation (%) | Surface Stiffness |
| --- | --- | --- | --- |
| Normal | 300 | about 20 | possession |
| Temperature |  |  |  |
| 130°–140° C. | 7 | about 200 | possession |
| Above 160° C. | 0 | about 500 | nil |

In one embodiment according to this invention, the secondary thermal control was carried out at temperatures in the range of from 130° to 140° C. The sheet resin 5' has little viscosity, but has stiffness in some degree at a temperature required for the press forming in the secondary thermal control process, so that the sheet resin can successively be transferred and injected without hindrance and easily formed by the press forming machine.

The softened sheet resin 5' to be injected into the press forming machine becomes devoid of stiffness or surface hardness when it is heated at a temperature in close proximity to the melting point thereof. In a word, since the sheet resin goes limp when being heated and softened at a temperature close to the melting point thereof, it is difficult to inject the sheet resin into the press forming machine at a relatively high temperature. Even when a sheet resin, soft at a high temperature, is subjected to a drawing process, particularly to a shrink-flange forming process, such processes reach the same result as by an overhang forming process and therefore, a reduction in thickness of the products is brought about. On the other hand, when the sheet resin is processed at a low temperature, it is possessed of a residual stress and is susceptable of transformation due to heat.

As described above, according to this invention, some processes for producing sheet resin inclusive of a process for extruding a molten resin, the sheet resin forming process, the cutting process and the press formng process in addition to the primary and secondary thermal controls can continuously be practiced consecutively. Consequently, the sheet resin to be processed can be kept constant at a desirable temperature by means of the primary and secondary thermal controls so that it can be injected into the press forming machine in good condition.

The consecutive processes of cutting, conveying and injecting the sheet resin into the press forming machine can be carried out without a hitch, since the sheet resin passed through the primary and secondary thermal controls has little tackiness, but has sufficient stiffness.

The sheet resin piece 5' thus kept at the desirable temperature is injected into the press forming machine 2, the sheet resin piece is intermittently subjected to a repeated clamp process synchronously with the injection of the sheet resin piece into the press forming machine, thereby continuously producing molded parts of good quality. The same heating mechanisms as in the secondary thermal control may be employed for the primary thermal control.

The injecting process of the sheet resin pieces into the press forming machine and the press forming process are synchronously and intermittently carried out, and also, the process of extruding the molten resin and the process of forming the sheet resin are synchronously and continuously carried out. To preclude the time deviation between the aforementioned synchronously intermittent work and the synchronously continuous work, a synchronizing device 8 is provided in front of the press forming machine 2, preferably before or after the cutter means 6.

Figure 3B:
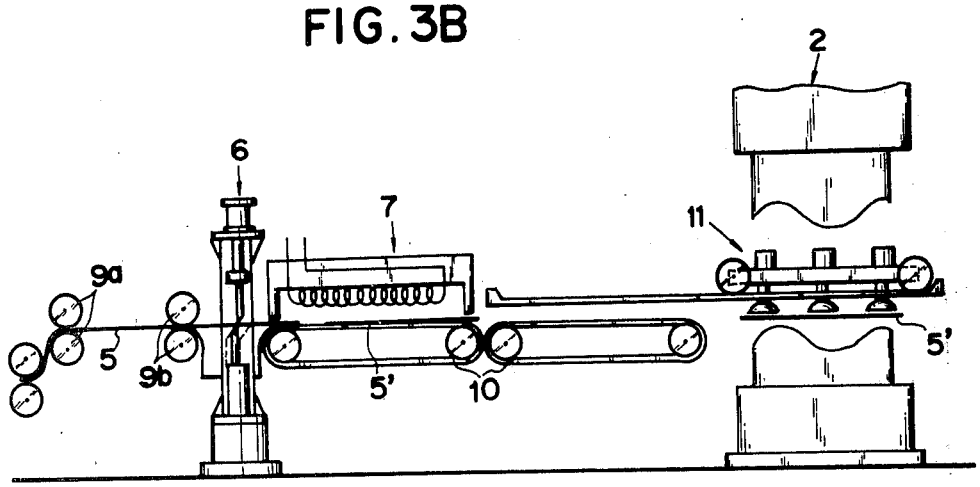

FIG. 2 and FIGS. 3(A) and 3(B) illustrate one embodiment of the synchronizing device 8. The synchronizing device is installed in front of the cutter means 6, so that the sheet resin strip 5 is dangled to form a U-shaped sag 5a between two pairs of pinch rollers 9a and 9b.

The paired pinch rollers 9a positioned on the extruder side are constantly rotated at the designated feed speed. The other paired pinch rollers 9b are so driven that while the cutter means 6 is worked the rollers are stopped so as to form the U-shaped sag 5a, and while the cutter means 6 is stopped, the rollers are rotated at the designated feed speed so as to contract the sag 5a.

Between the cutter means 6 and the press forming machine 2 is disposed a conveyor 10 for delivering the sheet resin piece 5' so that, every time the sheet resin is cut into the sheet resin pieces 5' by means of the cutter means 6, the sheet resin piece 5' is quickly forwarded to the entrance portion (transferring location) of the press forming machine 2.

The sheet resin piece 5' thus forwarded to the transferring location makes a pause there while the press forming machine is worked. Thus, the synchronization between the extrusion process and the intermittent press forming process can be achieved.

Figure 4A:
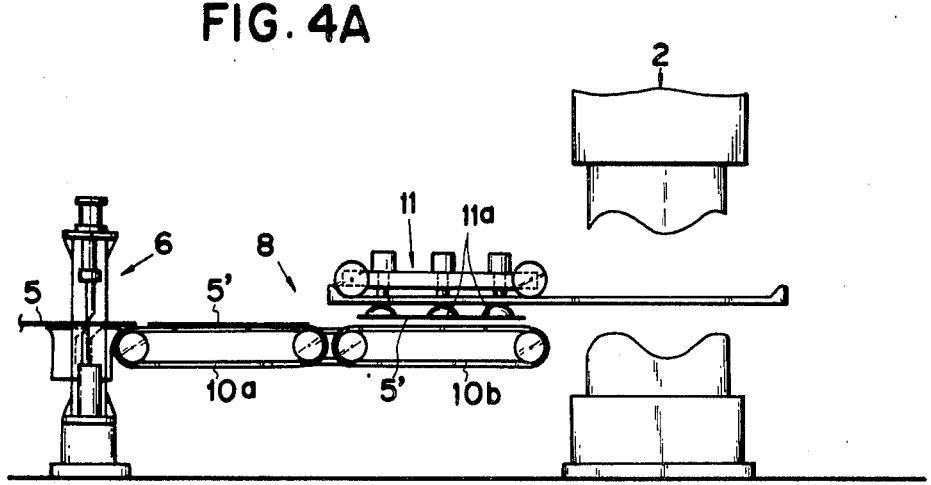
FIGS. 4(A) and 4(B) are explanatory views, respectively illustrating a synchronizing device used in another embodiment of the press forming method according to this invention.
Figure 4B:
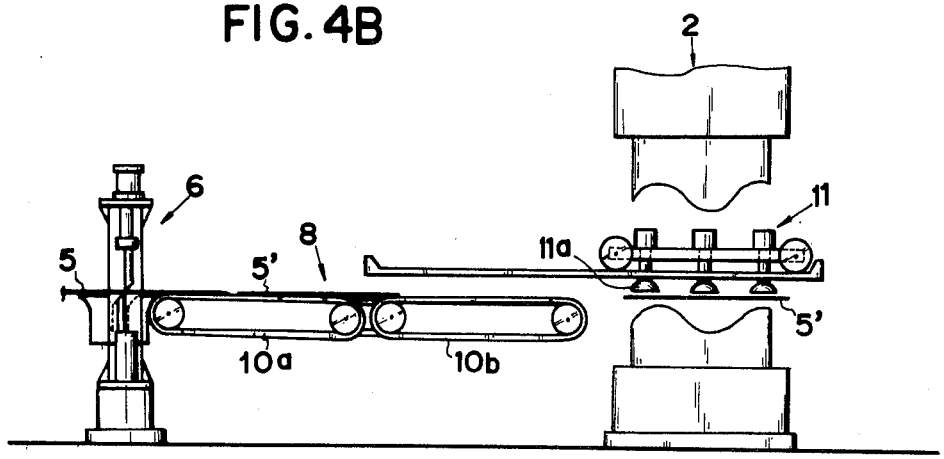

FIGS. 4(A) and 4(B) illustrate another embodiment in which two conveyors 10a and 10b are used for delivering the sheet resin piece from the cutter means 6 to the press forming machine 2 so that each conveyor can independently be controlled in its feed speed synchronously with each other. While the softened sheet resin is introduced into the cutter means 6 to a certain extent, the conveyors 10a and 10b are driven synchronously with the sheet forming process and the sheet feeding work. Then, the sheet resin piece obtained by means of the cutter means 6 is forwarded at high speed to the entrance portion of the press forming machine 2 through the medium of the conveyors 10a and 10b. Thereafter, the conveyor 10b installed on the press side is stopped while the press forming is carried out and at the same time, the conveyor 10a installed on the cutter side is converted in speed to the synchronous feed rate of the aforementioned softened sheet resin. Thus, the synchronization between the conveyors 10a and 10b can be carried out.

The sheet resin piece 5' which has passed through the secondary thermal control furnace 7 through the medium of the conveyor 10 or conveyors 10a and 10b, and then, forwarded to the entrance portion of the press forming machine 2, are injected to the prescribed position of the press forming machine 2 by means of the injecting device 11.

In the drawings is illustrated one preferred embodiment of the injecting device 11, in which a plurality of suction pads 11a are mounted on the lower surface of the frame thereof. The suction pads 11a are arranged on the frame of the injecting device 11 in a good balanced condition so as to stably lift the sheet resin piece 5' in the horizontal state. The frame provided with the suction pads 11a is driven by means of a mechanism composed of links and cams as a driving means so that the sheet resin piece 5' is lifted off the conveyor and transferred to the prescribed location on a forming die of the press forming machine 2. After the sheet resin piece 5' is set on the forming die, the frame provided with the suction pads 11a returns to the lifting location for the sheet resin piece on the conveyor and stays there until the successive transferring work begins. These operations are repeatedly carried out. Thus, the injecting device 11 functions as a communication means between the conveyor 10 or 10b and the press forming machine 2 and performs the transferring and setting operations synchronously with the press forming operation.

Figure 5A:
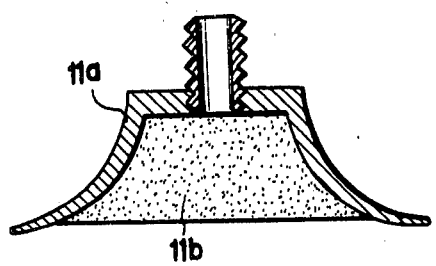
FIGS. 5(A), 5(B) and 5(C) are cross-sectional views, respectively, showing suction pads and a conveyor means used in an injection machine according to this invention.
Figure 5B:
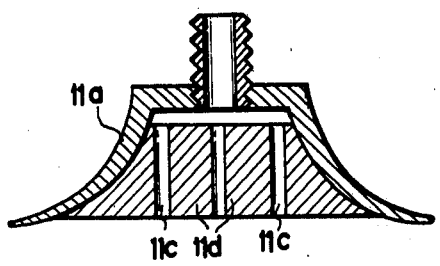

When such suction pads are used as a holding means for sheet resin in the injecting device 11, they may be made of elastic material such as rubber as illustrated in FIGS. 5(A) and 5(B). In this case, the suction pad 11a is filled with a filler 11b such as of foamed plastic having permeability or a filler 11d provided with air holes 11c so as to exert suction force to attract the sheet resin piece 5'.

Figure 5C:
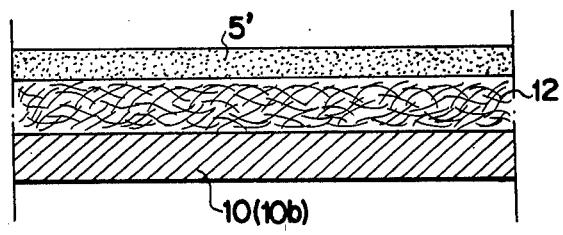

Since the sheet resin piece 5' has little surface stiffness and easily causes deformation at high temperature, it is nevertheless possible to effectively prevent partial deformation having influence on the sheet resin piece in press forming by utilizing the suction pads filled with the aforementioned fillers. Also, it is desirable to cover the surface of the aforementioned conveyor 10 or 10b with coating material 12 having permeability such as fabric material, for example, as illustrated in FIG. 5(C).

The disclosure in this part is not exclusive of using the other type of holding mechanisms used as an injecting device.

As described above, the continuous press forming method, according to the present invention, offers a new type of press forming device for sheet resins wherein all the processes from the extrusion step to the press forming step can be continuously carried out in a consecutive processing line, and in these processes the sheet resin is smoothly transferred to the press forming machine in good condition for press forming due to the proper thermal control.

Consequently, in the press forming according to the present invention, uneven distribution in temperature on the surface of the sheet resin and deleterious changes of the properties of the sheet resin, which often result from reheating the hardened sheet resin, are no longer caused. Besides, surface chapping, cracks and forming shrinkage due to press forming are not brought about because the transportation of the sheet resin in conjunction with a clamping operation is suitably carried out.

As a result, homogeneous formed products of good quality can continuously be mass-produced. In addition, a remarkably continuous press forming of sheet resins can be realized and productivity can be improved increasingly. These advantages bring about marked effects in that it is possible to produce an economical sheet resin product. Also, a circulation system of raw material on the market is so improved that a converter who owns a press forming machine may buy and processes the raw material by utilizing such consecutive processing line to mass-produce a sheet resin product.

Figure 6:
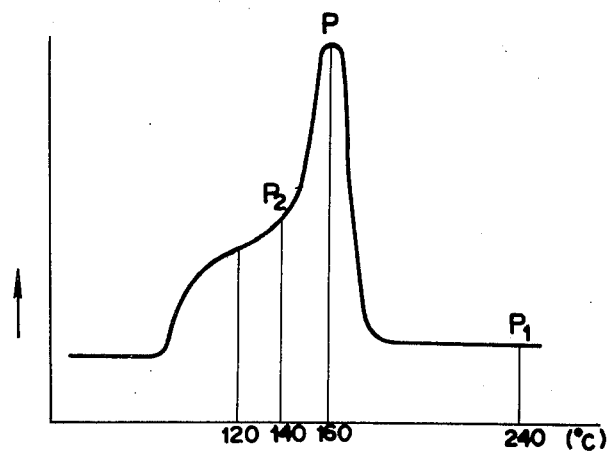
FIG. 6 is a diagram showing the specific heat characteristic curve of polypropylene.

The fundamental difference between the press forming method and an injection molding method is that the latter is practiced at a high temperature $P_1$ close to 240° C. which exceeds the peak point P (the melting point) in the diagram of the specific heat characteristic curve illustrated in FIG. 6 and on the other hand, the former (the present invention) is practiced at a relative low temperature $P_2$ close to 120° C. which is lower than the melting point P.

Consequently, the press forming method according to the present invention enjoys an extremely low cooling rate in respect to the sheet resin and low power consumption required for processing the sheet resin in comparison with the aforementioned injection molding method, and therefore, it excels in productivity and can produce a sheet resin product inexpensively.

What is claimed is:

1. A continuous method for press forming a sheet resin, which comprises the steps of:
   (a) continuously extruding molten resin from a supply source for the molten resin,
   (b) subjecting the extruded molten resin to a sheet forming to obtain a softened sheet resin strip synchronously with the extrusion of the molten resin from the supply source,
   (c) subjecting the softened resin to a primary thermal control step whereby the temperature of the resin sheet is regulated so that it possesses the necessary surface stiffness and thermoplasticity to be subsequently cut into pieces of a fixed length,
   (d) cutting the thus temperature regulated sheet resin strip into sheet resin pieces of a fixed length,
   (e) subjecting the sheet resin pieces to a secondary thermal control so that they possess the necessary thermoplasticity and surface stiffness so it can be subsequently press formed,
   (f) intermittently injecting said sheet resin pieces of a fixed length into a press forming machine, and
   (g) clamping said sheet resin pieces by use of the press forming machine synchronously with the injection of the sheet resin pieces into the press forming machine, whereby all the steps can be subjected to one consecutive operation.

2. A method according to claim 1 wherein a synchronizing step is carried out before or after the cutting step (d) such that successive steps of continuously extruding the molten resin and the step of forming the molten resin into the resin strip prior to the cutting operation and the intermittent step of transferring the sheet resin pieces into the press forming step are controlled so that the entire operation can be efficiently carried out in a synchronized manner.

3. A method according to claim 2 wherein the synchronizing step is carried out before the cutting step by means of two pairs of pinched rollers such that (1) the first pair which contacts the sheet prior to the cutting step are rotated according to a predetermined feed speed while (2) the second pinched pair of rollers located just before the cutting operation are intermittently stopped with each cutting step so that the resin strip is dangled between the rollers (1) and (2) to form a U-shaped sag.

4. A method according to claim 2 wherein the synchronizing step is carried out after the cutting step by means of two separate conveyors which deliver the cut resin pieces through the secondary thermal step and then to the press forming, said conveyors being independently controlled so that the conveyor on the press forming side is stopped while the press forming step is carried out and the conveyor on the cutter side is converted in speed to accommodate the synchronous movement of the resin sheet throughput the process.

5. A method according to claim 1 wherein the sheet resin pieces are intermittently injected into the press forming machine by means of an injection device with suction pads located on the lower portion of the injecting device for lifting the sheet pieces from the conveyor closest to the press forming machine and conveying the sheet resin pieces to the press forming machine in a horizontal matter synchronously with the entire sheet forming, cutting and press forming operations so that the entire process can be carried out in a continuous and efficient manner.

6. A method according to claim 2 wherein the sheet resin pieces are intermittently injected into the press forming machine by means of an injection device with suction pads located on the lower portion of the injecting device for lifting the sheet pieces from the conveyor closest to the press forming machine and conveying the sheet resin pieces to the press forming machine in a horizontal matter synchronously with the entire sheet forming, cutting and press forming operations so that the entire process can be carried out in a continuous and efficient manner.

7. A method according to claim 3 wherein the sheet resin pieces are intermittently injected into the press forming machine by means of an injection device with suction pads located on the lower portion of the injecting device for lifting the sheet pieces from the conveyor closest to the press forming machine and conveying the sheet resin pieces to the press forming machine in a horizontal matter synchronously with the entire sheet forming, cutting and press forming operations so that the entire process can be carried out in a continuous and efficient manner.

8. The method according to claim 4 wherein the sheet resin pieces are intermittently injected into the press forming machine by means of an injection device with suction pads located on the lower portion of the injecting device for lifting the sheet pieces from the conveyor closest to the press forming machine and conveying the sheet resin pieces to the press forming machine in a horizontal matter synchronously with the entire sheet forming, cutting and press forming operations so that the entire process can be carried out in a continuous and efficient manner.

9. A method according to claim 1 wherein the primary thermal control is carried out by directing the resin strip between a pair of heated rollers for a time and at a temperature sufficient to maintain the resin strip in a thermoplastic state and yet with a stiff surface, such that the resin can be efficiently cut in the cutting step and wherein the secondary thermal control is carried out by means of a furnace operating at temperatures sufficient to maintain the sheet resin pieces at the proper thermoplasticity and surface stiffness so they can be efficiently press formed.

10. A method according to claim 3 wherein the primary thermal control is carried out by directing the resin strip between a pair of heated rollers for a time and at a temperature sufficient to maintain the resin strip in a thermoplastic state and yet with a stiff surface, such that the resin can be efficiently cut in the cutting step and wherein the secondary thermal control is carried out by means of a furnace operating at temperatures sufficient to maintain the sheet resin pieces at the proper thermosplasticity and surface stiffness so they can be efficiently press formed.

11. A method according to claim 4 wheren the primary thermal control is carried out by directing the resin strip between a pair of heated rollers for a time and at a temperature sufficient to maintain the resin strip in a thermoplastic state and yet with a stiff surface, such that the resin can be efficiently cut in the cutting step and wherein the secondary thermal control is carried out by means of a furnace operating at the proper thermoplasticity and surface stiffness so they can be efficiently press formed.

* * * * *